United States Patent [19]

Nicholson

[11] 4,306,774
[45] Dec. 22, 1981

[54] SOLID STATE ELECTROCHROMIC DISPLAY

[75] Inventor: Margie W. Nicholson, San Marino, Calif.

[73] Assignee: Rockwell International Corporation, El Segundo, Calif.

[21] Appl. No.: 58,995

[22] Filed: Jul. 19, 1979

Related U.S. Application Data

[63] Continuation-in-part of Ser. No. 948,364, Oct. 4, 1978, Pat. No. 4,184,751, which is a continuation of Ser. No. 752,950, Dec. 20, 1976, abandoned.

[51] Int. Cl.³ .............................................. G02F 1/13
[52] U.S. Cl. .................................... 350/357; 252/408; 252/518; 252/521; 252/600
[58] Field of Search ................. 350/357; 252/408, 600, 252/518, 521

[56] References Cited

U.S. PATENT DOCUMENTS

| | | | |
|---|---|---|---|
| 3,971,624 | 7/1976 | Bruesch et al. | 350/357 |
| 3,995,943 | 12/1976 | Jasinski | 350/357 |
| 4,006,585 | 2/1977 | Tamaru et al. | 350/357 |
| 4,009,936 | 3/1977 | Kasai | 350/357 |
| 4,013,343 | 3/1977 | Jaccard et al. | 350/357 |
| 4,106,862 | 8/1978 | Bayard | 350/357 |
| 4,110,259 | 8/1978 | Jichel | 350/357 |
| 4,150,879 | 4/1979 | Bayard | 350/357 |
| 4,163,982 | 8/1979 | Domenico, Jr. et al. | 350/357 |
| 4,184,751 | 1/1980 | Nicholson | 350/357 |

FOREIGN PATENT DOCUMENTS

| | | | |
|---|---|---|---|
| 2756551 | 6/1978 | Fed. Rep. of Germany | 350/357 |
| 51-106683 | 9/1976 | Japan | 350/357 |
| 53-11891 | 2/1978 | Japan | 350/357 |

OTHER PUBLICATIONS

C.A., vol. 77, pp. 397–398, 107325(b) 1972, Citinc Maskalev, P. N. et al., Zh. Fiz. Khim., vol. 46(7), pp. 1778–1781 (1972).
C.A., vol. 74, p. 337, 17653(r) 1970, Citinc Moskalev, P. N. et al., Opt. Spektrosk, vol, 29(2), pp. 414–415 (1970).
C.A., vol. 91, 202, 143p (1979), Citinc Barna, G. G., J. Electron, Mater., vol. 8, No. 2, pp. 153–173 (1979).
C.A., vol. 87, 77015n (1977), Citinc Shilton, M. G., et al., Mater. Res. Bull., vol. 12 (7), pp. 701–706 (1977).
C.A., vol. 86, 35749d (1977).

*Primary Examiner*—Teddy S. Gron
*Attorney, Agent, or Firm*—H. Fredrick Hamann; Daniel R. McGlynn

[57] ABSTRACT

This invention is directed to a multicolored display which is based upon the rare-earth dipthalocyanines, and having a protonconductive, solid electrolyte which is selected for the electrochemical compatibility thereof with the electrochromic material in the display. Typically, the solid electrolyte consists of hydrogen uranyl phosphate or a related heteropoly acid.

2 Claims, 1 Drawing Figure

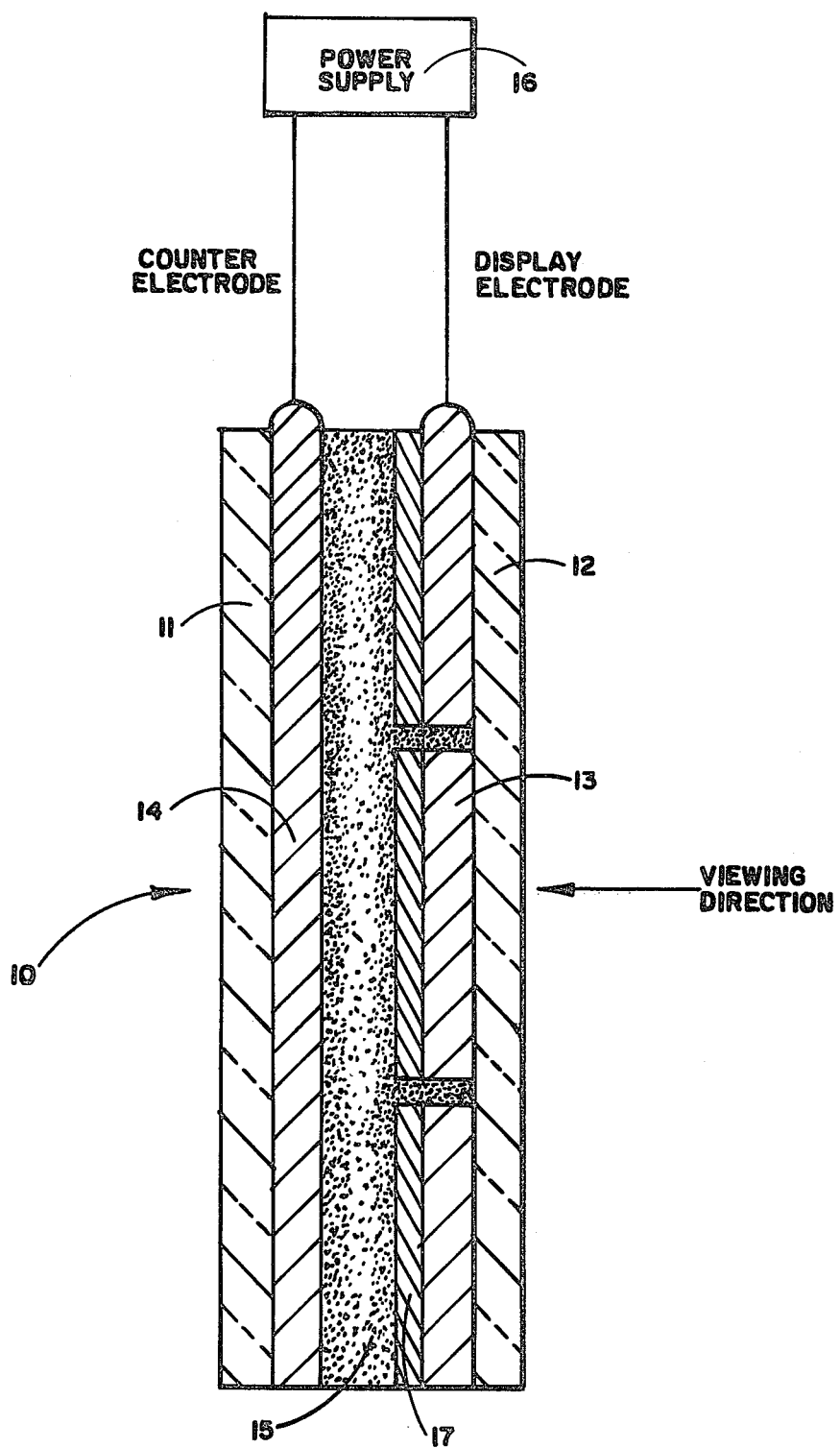

SOLID STATE ELECTROCHROMIC DISPLAY

The invention herein described was made in the course of or under a contract or subcontract thereunder, with the Department of the Navy.

This application is a continuation-in-part of the U.S. patent application Ser. No. 948,364, filed Oct. 4, 1978, now U.S. Pat. No. 4,184,751 which in turn was a continuation of U.S. Pat. application Ser. No. 752,950, filed Dec. 20, 1976 and now abandoned.

BACKGROUND OF THE INVENTION

1. Field of the Invention

This invention is directed to displays, in general, and to improved electrochromic displays, in particular.

2. Prior Art

In known multicolor electrochromic displays based on diphthalocyanine complexes of rare-earth elements, yttrium, or scandium, the diphthalocyanine dye material is contacted on one side by a liquid electrolyte, which is usually an aqueous potassium chloride solution. The other side of the dye is contacted by a transparent electronic conductor such as nonstoichiometric tin oxide. The liquid electrolyte is inconvenient for several reasons. For example, the cell must be sealed to resist internal pressure at elevated temperatures. In addition, it is possible that the electrolyte will freeze at a temperature slightly below 0° C. and cease to function until remelted. Gas bubbles are occasionally formed in the liquid electrolyte within the field of view, thereby detracting from the appearance of the display. Also, manufacturers psychologically resist using liquids in electronic device components other than batteries.

PRIOR ART STATEMENT

The most pertinent prior art known to applicant is listed herewith. U.S. Pat. No. 4,184,751, "Phthalocyanine Electrochromic Display," issued Jan. 22, 1980.

M. G. Shilton and A. T. Howe, "Rapid H+ Conductivity in Hydrogen Uranyl Phosphate—A Solid H+ Electrolyte", Mat. Res. Bull., 12, 701 (1977).

O. Nakamura, T. Kodama, I. Ogino, and Y. Miyake, "Electrolytic Generation of Hydrogen Using a Cell with a Hydrogen Ion-Conductive Solid Separator," Japan. Kokai 76,106,683 (1976); Chem. Abstr. 86:35749d.

R. D. Giglia, "Features of an Electrochromic Display Device," SID Digest, p. 52 (1975).

BRIEF DESCRIPTION OF THE DRAWINGS

The sole FIGURE is a schematic representation of a solid state electrochromic display in accordance with the instant invention.

DESCRIPTION OF THE PREFERRED EMBODIMENT

FIG. 1 is a schematic design of a display cell 10 in accordance with the instant invention. For example, an outer casing is omitted for convenience. A suitable power supply 16 is provided. In a preferred embodiment, the power supply provides about 1 or 2 volts D.C. between the counter electrode 14 and the display electrode 13. Suitable plates 11 and 12, for example formed of glass, are provided. A tin oxide-dye display pattern electrode 13 is disposed on glass plate 12. Counter electrode 14 that carries the same current as the display electrode 13 is disposed on glass plate 11. Counter electrode 14 has a coulombic capacity larger by a factor of ten or so than display electrode 13. A solid proton-conductive electrolyte 15 is disposed between the display electrode and the counter electrode. A layer of electrochromic material 17 is disposed on the display electrode and is selected from the group consisting of a diphthalocyanine of a rare-earth element, yttrium, and scandium.

In a preferred embodiment, counter electrode 14 may be one of several types.

For example, one type of counter electrode is a solid proton-dependent, oxidation-reduction couple deposited on an electrically conductive substrate such as porous (or nonporous) carbon, an inert metal, or conductive tin oxide. The counter electrode couple may be organic or inorganic. It may, in a preferred arrangement, consist of two forms of the multicolor electrochromic dye system itself. The proton-dependent couple functions as a counter electrode by undergoing a reaction represented by the equation

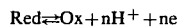

Another example of the counter electrode is a solid metal hydride or metal-hydrogen alloy, which undergoes an electrode reaction

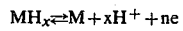

Another example of the counter electrode is a tin oxide layer on which an active species resembling the atomic hydrogen has been formed by cathodization or by other means. This would be a transparent counter electrode with a reaction such as

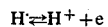

Another example of the counter electrode is a capacitive electrode consisting of a high-surface-area electronic conductor such as carbon black, in contact, throughout its microstructure, with the proton-conductive solid electrode. A capacitive electrode will generally be used in conjunction with a reference electrode (not shown), inasmuch as the potential at the capacitive interface will tend to shift significantly when the display color is electrically switched.

The preferred cell configurations will depend in part on the resistance due to the solid electrolyte layer. This resistance is estimated for to examples as follows:

EXAMPLE 1

Counter Electrode occupying entire back plate of the cell (sandwich configuration).

If the electrolyte is hydrogen uranyl phosphate ($HUO_2PO_4.4H_2O$) with a bulk conductivity of $4 \times 10^{-3}$ ohm$^{-1}$cm$^{-1}$, the electrolyte resistance $R_e$ through 1 cm$^2$ of display cell area will be $$R_e = l/(4 \times 10^{-3}) = 250l \qquad (1)$$

where $l$ is the thickness of the electrolyte layer in cm. Thus, a layer 0.01 cm (100 μm) thick contributes a resistance of about 2.5 ohms. For a typical diphthalocyanine plate, with an effective capacitance of 500 μf/cm$^2$, this resistance increases the switching time by only 1.2 ms. Such a delay is insignificant in most display applications. Since relatively thick electrolyte films (0.01 to 0.1 cm) can be used in the cell, it should not be difficult to avoid electronic short circuits through the cell. If both the counter electrode 14 and the electrolyte layer 15 are transparent or semitransparent, the display could be observed with back lighting. If the electrolyte 15 is in the form of a pressed powder or similar polycrystalline structure that reflects most of the incident light, viewing by front lighting would be preferred.

EXAMPLE 2

Counter electrode offset from the display electrode

In offset configurations, the sheet resistance $\rho_s$ of the electrolyte must be considered. If the display and counter electrodes are in the same plane or otherwise arranged so that, effectively, they are in contact with opposite edges of one square of electrolyte layer lying therebetween, the electrolyte resistance is given by $$\rho_s = \rho_b / l \qquad (2)$$

where $\rho_b$ is the bulk resistance. Then, if $\rho_b = (4 \times 10^{-3}) = 250$ ohm-cm, and the electrolyte layer thickness is 0.1 cm, one square of electrolyte contributes a resistance of 2,500 ohms, or a time delay of 1.25 s. This is acceptable for displays in which extremely rapid response is not required. It is apparent, however, that the offset arrangement should be avoided in fast-response displays unless it involves considerably less than 1 square of the solid electrolyte layer between the display electrode and counter electrode.

In this invention, the electrolyte is one of several solid electrolytes chosen for the ability to meet the electrochemical requirements of the diphthalocyanine electrochromic material. Present knowledge of the diphthalocyanines suggest that the requirements for the electrolyte appear to be: (a) High ionic conductivity and negligible electronic conductivity, (b) ability to reversibly inject protons ($H^+$ or $H_3O^+$) into the dye phase or reversibly remove them, (c) ability to provide other chemical species contained in or derived from the system $H_2O-H_2-O_2$, including $H_2O$ molecules, $H\cdot$ or $OH\cdot$ radicals, $OH^-$ ions, $O_2$ molecules, $H_2O_2$ or the like. The different color states of the diphthalocyanine are believed to be created by introduction or removal of such species in response to a change in potential difference applied at the dye/electrolyte interface. A solid electrolyte is needed, therefore, which is a proton conductor and, in effect, a solid source of water. Derived reagent species including $H\cdot$, $OH\cdot$, $O_2$ and others can be generated in appropriate quantities by electrolysis within a display cell containing such a solid electrolyte. The generation of these reagent species may occur on areas of tin oxide that are not completely covered by the electrochromic dye, or on the surface of the dye film itself. A finely divided metal such as elemental platinum may be incorporated in the tin oxide-dye electrode, if necessary, to catalyse the electrolytic formation of reagent species.

The solid electrolyte can be one of several recently identified solid proton conductors with room-temperature bulk ionic conductivity of the order of $10^{-3}$ to $10^{-2}$ ohm$^{-1}$cm$^{-1}$. These proton conductors include hydrogen uranyl phosphate $HUO_2PO_4.4H_2O$, $H_3PW_{12}O_{40}.29H_2O$, $H_3PMo_{12}O_{40}.30H_2O$, and other related heteropoly acids. In principle, more commonly known solid proton conductors such as lithium sulfate monohydrate $Li_2SO_4.H_2O$ could also be used for this purpose, but the conductivities thereof are several orders of magnitude lower than those of the conductive heteropoly acids whereby these materials are less of interest. That is, low electrolyte conductivity will cause a slow response of the electrochromic display.

Hydrogen uranyl phosphate tends to be yellow in bulk crystal form, and pale yellow in thin-film or powder form. The pale yellow color is not objectionable, for example, with lutetium diphthalocyanine. An electrolyte as thin as 1 $\mu$m could prove satisfactory (uniform and free of pin-holes) in this application. Of course, if the color due to hydrogen uranyl phosphate or other heteropoly acid electrolytes is too pronounced, an inexpensive color compensating filter can be placed over the display cell. Moreover, a pale yellow color would be compensated automatically (to some extent) by the natural bluish-gray color in some preparations of tin oxide on which the electrochromic dye is deposited.

A major purpose of this description is to describe an all-solid-state multicolor electrochromic display based on the diphthalocyanine complexes of rare earths and other trivalent metals. However, the same proton-conductive electrolytes will also be useful with other electrochromic materials that require protons for electrochromic responses. An example is the tungsten oxide electrochromic, which is often used with a sulfuric acid electrolyte. Moreover, the use of hydrogen uranyl phosphate or a heteropoly acid with tungsten oxide has been reported in paper No. B-8 in the Electronic Materials Conference, Boulder, Colorado, June 27, 1979 and a paper by Barna in J. Elec. Mat., Vol. 8, p. 155 (1979), for example. A solid proton conductor consisting of hydrogen uranyl phosphate or one of the heteropoly acids mentioned herein may be an adequate source of protons for this electrochromic material. The counter electrode could be the same electrochromic couple used for the display electrode, or it could be one of the counter electrodes described above.

While the invention has been illustrated and described as embodied in a solid state electrochromic display, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

We claim:
1. An electrochromic display cell comprising:
   a pair of enclosure plates, at least one of which is transparent;
   a counter electrode and
   a display electrode disposed between said enclosure plates;
   a layer of electrochromic material disposed on said display electrode, said layer of electrochromic material being selected from the group consisting of a diphthalocyanine of a rare-earth element, yttrium, and scandium; and
   a solid electrolyte material disposed between said counter electrode and said display electrode, said electrolyte material being selected from the group consisting of a heteropoly acid, and hydrogen uranyl phosphate ($HUO_2PO_r.4H_2O$).
2. The display cell recited in claim 1 including: power supply means connected between said counter electrode and said display electrode.

* * * * *

UNITED STATES PATENT AND TRADEMARK OFFICE
CERTIFICATE OF CORRECTION

PATENT NO. : 4,306,774
DATED : December 22, 1981
INVENTOR(S) : Margie M. Nicholson It is certified that error appears in the above-identified patent and that said Letters Patent are hereby corrected as shown below:

On the front sheet, item [75] please delete the inventor's middle initial "W" and insert --M.--.

In column 2, line 42, please delete "electrode." and insert --electrolyte.--.

In column 2, line 49, please delete "to" and insert --two--.

In column 3, line 10, following the word "electrode" please insert --.--.

In column 3, line 21 please delete "$\rho_b = (4 \times 10^{-3}) = 250$" and insert --$\rho_b = 1/(4 \times 10^{-3}) = 250$--.

In column 4, line 64, please delete "$(HUO_2PO_r.4H_2O)$." and insert --$(HUO_2PO_r \cdot 4H_2O)$.--.

Signed and Sealed this

Twenty-fourth Day of August 1982

[SEAL]

Attest:

GERALD J. MOSSINGHOFF

Attesting Officer   Commissioner of Patents and Trademarks